Nov. 16, 1965  C. AGUADISCH  3,218,359
PREPARATION OF ALKOXYALKENES
Filed Dec. 22, 1960
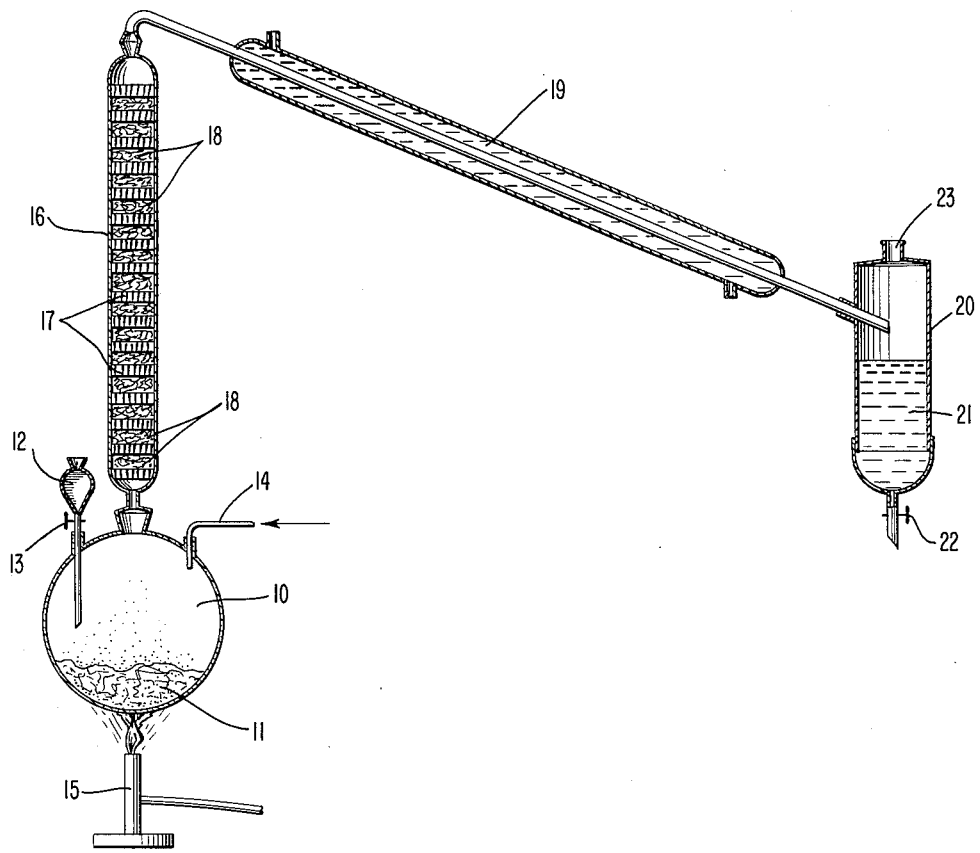
INVENTOR
CLAUDINE AGUADISCH
BY *Bauer and Seymour*
ATTORNEYS

United States Patent Office 3,218,359
Patented Nov. 16, 1965

3,218,359
PREPARATION OF ALKOXYALKENES
Claudine Aguadisch, Sevres, France, assignor to Compagnie de Saint-Gobain, Neuilly-sur-Seine, France
Filed Dec. 22, 1960, Ser. No. 77,653
Claims priority, application France, Jan. 8, 1960, 815,177
8 Claims. (Cl. 260—614)

This invention relates to the preparation of alkoxypropenes and other alkoxyalkenes.

Alkoxypropenes of the formula

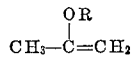

have been prepared by thermal dissociation, in liquid or vapor phase, of ketals constituted by the corresponding 2,2-dialkoxypropanes. In the formula R represents lower alkyl of one to ten C atoms. In such pyrolytic cracking catalysts have been tried, including phosphoric anhydride plus quinoline, volatile acidic substances like sulfur dioxide, HCl and ethyl sulphate and some of them have produced improvement in yield over non-catalytic methods but none of them, so far as known, has produced a satisfactory yield. About the best of such minor catalysts are an ultra fine mixture of silica and alumina, and thorine, which were not publicly known so far as the literature has disclosed.

It is an object of the invention to prepare alkoxypropenes of the formula

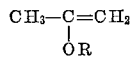

directly, in excellent yield.

Another object is to improve the yield of former, similar cracking processes. A particular object is to crack 2,2-dialkoxypropanes, to which the present process is selectively beneficial.

The invention will be described in relation to the manufacture of the commercially important members of the series in which R, in the above formula, is methyl or ethyl.

The objects of the invention are accomplished, generally speaking, by pyrolytically cracking a dialkoxyalkane of which 2,2-dialkoxypropane is of exceptional interest, on an anhydrous metallic pyrophosphate, as a catalyst, of which magnesium pyrophosphate and calcium pyrophosphate are outstanding examples, other examples being the anhydrous pyrophosphates of the light metals contiguous to Mg and Ca in the periodic table of the elements. Of this secondary class of catalysts, anhydrous sodium pyrophosphate is representative. The reaction is carried out in inert atmosphere of which nitrogen, helium, and argon are exemplary, at a temperature from 250 to 350° C. The reaction products, mainly alkoxypropene and alcohol, are condensed and mixed with water, which dissolves the alcohol and forms a layer on which the alkoxypropene floats. It is isolated, dried and distilled.

The process produces in excellent yield alkoxypropenes of the general formula

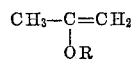

in which R represents lower alkyl, for instance methyl, ethyl, propyl, butyl, isobutyl, amyl, and hexyl according to the constitution of the dialkoxyalkane used as the raw material. The reaction proceeds by the elimination of a molecule of the alcohol corresponding to the alkoxy groups on the raw material to the production of the desired alkoxypropene. In the broader extent of the invention the raw material has the formula

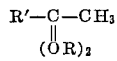

in which R' is alkyl of from 1 to 10 C atoms.

In the cracking furnace the catalyst is advantageously laid in superimposed layers which are separated by inert porous layers, for instance layers of mineral or glass wool. The catalyst is preferably finely divided, for instance as a powder. It is advantageous to circulate an inert gas through the apparatus throughout the process. There are many inert gases, but nitrogen is readily available and is satisfactory.

According to the preferred form of the invention the ketal is introduced into a reaction chamber at the boiling point of the ketal, which is about 80° C. for dimethoxypropane and diethoxypropane and the vapors are conducted through a vertical cracking furnace supplied with the catalyst layers which are heated to cracking temperature. This temperature is from 250 to 350° C. for dimethoxy and diethoxypropanes, for which optimum results are attained at about 300° C., but the most desirable temperature may vary for the higher homologues of the series. The products of decomposition are gases which flow to a condenser, for instance water cooled, and are collected in a receptacle; the product is washed with water, which dissolves the alcohol and floats the alkoxyalkene, and the parts are separated by decantation.

The purification of the alkoxyalkene layer desirably takes place by drying on contact with potassium and then sodium, followed by distillation of the dried product.

The catalyst may become fatigued after use and may be regenerated by passing a current of hot anhydrous nitrogen through it. For magnesium pyrophosphate the best regenerating temperature is 350° C. This temperature is also satisfactory for the other catalysts but the optimum temperature of regeneration may differ for different catalysts.

The above and further objects and novel features of the present invention will more fully appear from the following detailed description when the same is read in connection with the accompanying drawing. It is to be expressly understood, however, that the drawing is for the purpose of illustration only and is not intended as a definition of the limits of the invention, reference for this latter purpose being had primarily to the appended claims.

The drawing is a diagram of a simple form of apparatus, in which 10 represents a reaction vessel in which the dialkoxyalkene 11 is received from reservoir 12 through a valve or trap 13, and through which a current of nitrogen flows from inlet tube 14. The vessel is heated to the vaporization temperature of the raw material by means 15, diagrammatically shown. The vapors of the ketal ascend into a cracking chamber 16 provided with layers of catalyst separated by layers of rock wool 18. The cracked products come off at the top of the column 16 and pass through condenser 19, which is water cooled. The liquid condensate is caught in water filled vessel 20 which is kept free of air by the flow of nitrogen from the condenser. From time to time the mixture 21 of alcohol solution and alkoxyalkene are drawn off through valve 22 and more water is added through the neck 23 of the receptacle.

The following examples illustrate the method without limiting the generality of what is elsewhere described and claimed.

*Example 1*

70 g. of 2,2-dimethoxypropane are introduced at about 20 drops per 30 seconds into a flask heated to 80° C. under an atmosphere of nitrogen, the vapors pass through magnesium pyrophosphate in a furnace heated to 300° C. and there is recovered at the discharge from the condenser 67 g. of a mixture of methyl alcohol and 2-methoxypropene. The alcohol is removed by washing with water, and by drying the decanted alkoxypropene on potassium and sodium, and the purification is completed by distillation, producing a colorless liquid, B.P. 34–35° C., index of refraction $n_D^{22}=1.3786$, which is 2-methoxypropene. The yield is 77% of the theoretically possible. The infra red spectrum reveals the presence of double bonds and the methoxy group. Analysis gives the following results:

Theory _____ C=66.7 H=11.1 O=22.2
This product _____ C=66.4 H=11.2 O=22.2

*Example 2*

In the same way as in Example 1, 70 g. of 2-2-diethylpropane is vaporized, catalytically cracked, and recovered, producing 2-ethoxypropene boiling at 60–61° C., index of refraction $n_D^{20}=1.3837$ at a yield of 63%. The infra red spectrum reveals the presence of the double bond and the ethoxy group, and the analysis discloses the composition:

Theory _____ C=69.8 H=11.6 O=18.6
This product _____ C=69.7 H=11.4 O=18.8

*Example 3*

Under identical conditions, except for use of calcium pyrophosphate as the catalyst the yield of 2-methoxy-propene was 74.5% and of 2-ethoxypropene was 47%.

For the purpose of comparing former pyrolytic cracking processes known to this inventor, using the best of such catalysts with all other conditions identically as set forth for this invention, tests were carried out on the same raw materials using the same rates of flow at identical temperatures, with the following results:

For 2-methoxypropene.

| Catalyst: | Yield, percent |
|---|---|
| Test 1.—Thorine | 40 |
| Test 2.—Ultra fine mixture of silica and alumina | 67 |

For 2-ethoxypropene.

| Catalyst: | Yield, percent |
|---|---|
| Test 1.—Calcined alumina | 0 |
| Test 2.—Ultra fine silica-alumina | 23 |
| Test 3.—Thorine | 37 |

If one compares magnesium pyrophosphate with silica-alumina the advantage of this invention is 10% increase in yield for 2-methoxypropene and 40% increase in yield for 2-ethoxypropene.

If one compares calcium pyrophosphate with silica-alumina the advantage in yield for this invention is 37% for 2-methoxypropene and 26% for 2-ethoxypropene.

The advantages of this invention are greater in comparison with the publicly catalysts for this reaction.

The process of this invention also proceeds with the pyrolytic cracking of 1,3, and 1,1-dialkoxypropanes but not with equally advantageous results. Hence, the process is regarded as exceptionally beneficial when applied to dialkoxyalkanes which have both alkoxy groups attached to the same internal C atom, which should occupy the position 2.

The process also proceeds with the pyrophosphates of light metals contiguous to Ca and Mg in the periodic table of the elements, of which sodium pyrophosphate is exemplary, but they do not produce results as to yield equivalent to the preferred Ca and Mg pyrophosphate catalysts and are non-competitive.

As many apparently widely different embodiments of the present invention may be made without departing from the spirit and scope thereof, it is to be understood that the invention is not limited to the specific embodiments.

What is claimed is:

1. A method of preparing lower alkoxypropenes that comprises vaporizing a 2,2-di-loweralkoxypropane in nitrogen atmosphere, at a temperature of about 250–350° C., in contact with anhydrous magnesium pyrophosphate, condensing the reaction products, and isolating the 2-loweralkoxypropene.

2. A method of preparing loweralkoxypropenes that comprises bringing a 2,2-di-loweralkoxypropane in inert atmosphere at cracking temperature of about 250° C. to 350° C. into contact with anhydrous calcium pyrophosphate, condensing the reaction products, and isolating the 2-loweralkoxypropene.

3. A method of preparing a loweralkoxypropene that comprises pyrolytically cracking a 2,2-di-loweralkoxypropane on a catalyst comprising an anhydrous pyrophosphate of one of a group of light metals consisting of Ca and Mg in inert atmosphere at a temperature between about 250° and 350° C., condensing the reaction products and mixing them with water, isolating the 2-loweralkoxypropene, and purifying it by distillation.

4. A method of preparing a lower alkoxypropene that comprises pyrolytically cracking a 2,2-di-loweralkoxypropane on a catalyst comprising an anhydrous pyrophosphate of one of a group of light metals consisting of Ca and Mg in inert atmosphere at cracking temperature, and isolating the 2-loweralkoxypropene.

5. A method of preparing a lower alkoxyalkene that comprises pyrolytically cracking a 2,2-di-loweralkoxypropane on an anhydrous pyrophosphate of one of a group of light metals consisting of Ca and Mg in inert atmosphere, and at a temperature of about 250° to 350° C., and recovering the 2-loweralkoxypropene.

6. A method of preparing 2-methoxypropene which comprises vaporizing 2,2-dimethoxypropane, passing it into contact with at least one member of the group consisting of Mg and Ca pyrophosphates at a temperature about 250–350° C. in inert atmosphere, condensing the gaseous reaction products, washing the condensate with water, drying the 2-methoxypropene on an alkali metal, and recovering the 2-methoxypropene.

7. The method of making 2-ethoxypropene which comprises vaporizing 2,2-diethoxypropane, passing it into contact with at least one member of the group consisting of Ca and Mg pyrophosphates at a temperature about 250–350° C. in inert atmosphere, condensing the gaseous reaction products, extracting the condensate with water, drying the 2-ethoxypropene on alkali metal, and recovering the 2-ethoxypropene.

8. The method of making lower alkoxypropenes which comprises vaporizing a 2,2-di-loweralkoxypropane, passing the vapor into contact with at least one member of the group consisting of Ca and Mg pyrophosphates at a temperature about 250–350° C. in inert atmosphere, condensing the gaseous reaction products, extracting the condensate with water, and recovering, the 2-loweralkoxypropene.

References Cited by the Examiner

UNITED STATES PATENTS 1,902,169  3/1933  Herrmann et al. _____ 260—614
2,189,529  2/1940  Carothers et al. _____ 260—614

LEON ZITVER, *Primary Examiner.*

CHARLES B. PARKER, *Examiner.*